United States Patent
Groll et al.

(10) Patent No.: US 9,199,378 B2
(45) Date of Patent: Dec. 1, 2015

(54) CALIBRATION OF A MANIPULATOR

(75) Inventors: Michael Groll, Augsburg (DE); Thomas Purrucker, München (DE); Dietmar Tscharnuter, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 676 days.

(21) Appl. No.: 12/883,309

(22) Filed: Sep. 16, 2010

(65) Prior Publication Data

US 2011/0066393 A1    Mar. 17, 2011

(30) Foreign Application Priority Data

Sep. 16, 2009    (DE) .................. 10 2009 041 734

(51) Int. Cl.
 *G01C 17/38*    (2006.01)
 *B25J 9/16*    (2006.01)
(52) U.S. Cl.
 CPC .............. *B25J 9/1692* (2013.01); *B25J 9/1676* (2013.01); *G05B 2219/39045* (2013.01)
(58) Field of Classification Search
 CPC ........................... B25J 9/1692; B01D 5/24452
 USPC .......................................................... 702/94
 See application file for complete search history.

(56) References Cited

U.S. PATENT DOCUMENTS

| | | | | |
|---|---|---|---|---|
| 5,177,563 A | * | 1/1993 | Everett et al. ................. | 356/621 |
| 5,983,512 A | * | 11/1999 | Trapet ............................. | 33/502 |
| 6,044,308 A | * | 3/2000 | Huissoon ...................... | 700/166 |
| 6,078,846 A | * | 6/2000 | Greer et al. ................... | 700/174 |
| 6,615,112 B1 | * | 9/2003 | Roos ............................. | 700/254 |
| 2004/0172164 A1 | * | 9/2004 | Habibi et al. ................. | 700/245 |
| 2006/0262961 A1 | * | 11/2006 | Holsing et al. ................ | 382/103 |
| 2008/0010705 A1 | * | 1/2008 | Quaid et al. ...................... | 901/8 |
| 2008/0188983 A1 | * | 8/2008 | Ban et al. ...................... | 700/245 |
| 2008/0216552 A1 | * | 9/2008 | Ibach et al. .................... | 73/1.01 |
| 2008/0300723 A1 | * | 12/2008 | Ban et al. ...................... | 700/259 |
| 2010/0103431 A1 | * | 4/2010 | Demopoulos ................. | 356/622 |
| 2010/0152870 A1 | * | 6/2010 | Wanner et al. .................. | 700/97 |
| 2011/0022216 A1 | * | 1/2011 | Andersson .................... | 700/114 |

FOREIGN PATENT DOCUMENTS

| | | | |
|---|---|---|---|
| DE | 196 16 276 | A1 | 10/1997 |
| DE | 198 26 395 | A1 | 12/1999 |
| DE | 10 2004 021 892 | A1 | 12/2005 |
| DE | 10 2004 021 893 | A1 | 12/2005 |
| DE | 10 2004 024 378 | A1 | 12/2005 |
| DE | 10 2004 026 814 | A1 | 12/2005 |
| EP | 1 521 211 | A2 | 4/2005 |
| WO | 2008/107715 | A2 | 9/2008 |
| WO | WO 2010/060459 | * | 6/2010 |

OTHER PUBLICATIONS

German Patent Office; Search Report in German Patent Application No. 102009041734.6 dated Jan. 28, 2010; 4 pages.

* cited by examiner

*Primary Examiner* — Michael Nghiem

(74) *Attorney, Agent, or Firm* — Wood, Herron & Evans, LLP

(57) ABSTRACT

A measuring apparatus (1; 1') for measuring a manipulator (10), with a measuring body (2; 2') having at least one measurement point (3; 3') that is fixed in relation to the measuring body for determining a position ($T_{TCP,3}$; $T_{TCP,3'}$) relative to a reference point (TCP) that is fixed in relation to the manipulator, and an attaching device connected to the measuring body (2) for fixing on the surroundings, includes at least one calibration point (7; 7') connected to the measuring apparatus for determining a position ($T_{R, M}$; $T_{R,M'}$) relative to the surroundings and/or at least one measurement point (6) positioned on the attaching device.

16 Claims, 1 Drawing Sheet

CALIBRATION OF A MANIPULATOR

TECHNICAL FIELD

The present invention relates to a method and an apparatus for measuring a manipulator, in particular a robot, as well as the production of such an apparatus.

BACKGROUND

Manipulators, for example industrial robots, are intended to move to poses highly precisely, as a rule many times, in order to bring a tool to a desired position.

Manipulator arms and joints can heat up, in particular due to heat emission from the drive motors, friction in the manipulator kinematics, but also environmental influences. The accompanying change in shape, in particular thermal expansion, results in the tool no longer occupying the same position, despite the same joint position, i.e., theoretically the identical pose.

It is therefore known, for example from DE 10 2004 024 378 A1, to measure the manipulator relatively, in order to register the deviation of its kinematics during operation. In that process the manipulator moves in regular recalibration cycles to the same joint positions, i.e., theoretically the same pose, and registers a spherical reference body by using a manipulator-guided sensor. If the registered position of the stationary reference body changes relative to the manipulator-guided sensor, this can be used to ascertain the change in the manipulator kinematics and can be compensated for accordingly.

Besides this relative measurement, absolute measurement of manipulators is also known, in order to calibrate them or to determine the parameters of a manipulator model on which a manipulator control system is based. For example, if a trajectory of an industrial robot is planned offline in advance, it depends on the exactness of the model parameters how precisely that real robot moves to the theoretically predefined positions. DE 198 26 395 A1 proposes to this end that the position of a manipulator-guided reference body be registered by stationary cameras, and that the model parameters be adjusted on the basis of the deviation of this actual position from a theoretical position determined using the model.

SUMMARY

WO 2008/107715 A2 proposes to register the position of retroreflectors on a robot base using a laser tracker on the arm of the robot, and to determine the position of the arm relative to the base precisely therefrom.

The object of the present invention is to improve the measurement of a manipulator.

A measuring apparatus according to the invention for measuring a manipulator, in particular a robot such as an industrial, service or light construction robot, preferably a measuring robot having one or more robot-guided sensors such as cameras or laser trackers, has a measuring body with one or more measuring points that are fixed relative to the measuring body, to determine a position relative to a reference point that is fixed in relation to the manipulator, for example the tool center point (TCP).

The measuring body in one preferred embodiment is essentially spherical, in order to portray the same conditions in essentially all spatial directions. In another preferred embodiment the measuring body has essentially the shape of a rectangular block, in particular a cube, which on the one hand offers preferred orientations and on the other hand simplifies processing. Preferably the measuring body exhibits only slight thermal deformation, in particular a longitudinal coefficient of expansion a less than or equal to $10 \cdot 10^{-6}$/K; it is preferably made of carbon-fiber reinforced plastic (CFRP).

A measuring point fixed relative to the measuring body, referred to hereinafter as a measuring body measurement point, may have for example a sensor, in particular for transmitting or receiving electromagnetic radiation, such as for example a camera or a laser tracker, with which a position is determined, in particular a distance relative to a reference point fixed in relation to a manipulator, such as for example a reflecting mark, for example a retroreflector. Since the measuring body preferably has a plurality of measuring body measurement points, in a preferred embodiment conversely measuring body measurement points are defined by markings, for example reflective marks, that are registered by a sensor, in particular an optical sensor such as a camera or a laser tracker. Additionally or alternatively, measuring body measurement points can also be defined by geometric features, for example boreholes, grooves, steps and the like, which are then preferably recorded by a camera in order to ascertain their position using image recognition.

Position refers in the present case in particular to a one-, two- or three-dimensional location, describable for example by a Cartesian distance or Cartesian coordinates in an image plane or a three-dimensional reference system, and/or an orientation, describable for example by Euler or cardan angles relative to the reference system, or quaternions. Accordingly, the position of a point can include for example its one-dimensional distance from a reference point, its three-dimensional location in a reference system, or the location and orientation, specifiable using six coordinates, of a reference coordinate system defined at that point, for example the TCP system, relative to a reference system.

Connected to the measuring body, for example via a rod-shaped, pipe-shaped or shaft-shaped connecting element which is preferably made in a single piece with the measuring body in order to reduce assembly tolerances and thermal changes, in order to simplify the production or assembly, there may be an attaching device, in particular a flange or a base plate, which is provided to fix the measuring apparatus, detachably or non-detachably, to a surrounding, preferably inertial, such as for example a production or robot cell in which the manipulator base is attached. To this end, the attaching device may have corresponding boreholes for bolting to the surroundings.

According to a first aspect of the present invention, one or more measurement points, referred to hereinafter as attaching device measurement points, are situated on this attaching device. These, like the measuring body measurement points, can be defined by a sensor, by markings detectable by a sensor, and/or by geometric features. Preferably measuring body measurement points and attaching device measurement points are of similar design, so that they can be detected by the same sensor, in particular a camera.

It is thereby possible on the one hand to check the measuring device, in particular a position of the measuring body relative to the attaching device and thus to the surroundings to which the attaching device is affixed. That makes it possible for example to detect a displacement of the measuring body due to a collision with the manipulator, and to compensate for it if necessary.

To this end, positions of measuring body measurement points relative to a measuring device reference system which is defined in reference to the attaching device measurement points are determined in advance, in particular optically, for example using a coordinate measuring machine, an image-producing method and/or a manipulator-guided sensor.

Positions of a reference point fixed in relation to the manipulator are then determined, on the one hand relative to measuring body measurement points and on the other hand relative to fastening device measurement points, for example by having a camera or a laser tracker on the tool flange of a robot record markers or retroreflectors on the measuring body on the one hand and on the base plate on the other hand, and using an image processing or distance measuring system to determine the relative position between the latter and the tool flange. From this information it is possible to determine the position of the measuring body measurement points relative to the attaching device measurement points, and thus of the measuring body relative to the attaching device or the surroundings. If this position deviates from the position determined in advance in the measuring device reference system defined in reference to the attaching device measurement points, a displacement or twisting of the measuring body relative to the attaching device or the surroundings can be recognized from this. In one advantageous refinement such a displacement or twisting of the measuring body is compensated for, for example by taking into account the displacement or twisting relative to the starting position, at which positions of measuring body measurement points were measured relative to the measuring device reference system, when determining the positions of measuring body measurement points and a reference point fixed in relation to the manipulator, relative to each other. Such recognition of or compensation for a displacement or twisting of the measuring body is preferably carried out during a diagnosis.

On the other hand, a state of the manipulator, in particular a change in its kinematics due to thermal or mechanical causes, can be determined thereby.

To this end, positions of the reference point fixed in relation to the manipulator are determined relative to measuring body measurement points. For example, a camera or a laser tracker on the tool flange records markers on the measuring body, and an image processing or distance measuring system determines the relative position between them and the tool flange. If this relative position changes between two tests of state or calibrations, preferably carried out cyclically, a change in the manipulator kinematics can be determined from this which is taken into account in a preferred embodiment in the kinematic model of the manipulator.

According to a second aspect of the present invention, which can be combined with the first aspect explained above, one or more calibration points connected to the measuring device are situated, preferably on the attaching device or the measuring body, to determine a position relative to the surroundings. Such calibration points, like the measuring body measurement points or attaching device measurement points, can be defined by a sensor, by markings detectable by a sensor, or by geometric features. In a preferred embodiment, calibration points are defined by retroreflectors whose position relative to the surroundings is determined by a laser tracker. Such a laser tracker can be placed on a stand of its own and preferably calibrates itself in the surroundings, in order to then determine the spatially fixed position of the measuring body relative to the surroundings.

Again, positions of measuring body measurement points relative to a measuring device reference system which is defined in reference to the calibration points are determined in advance, for example using a coordinate measuring machine, an image-producing method and/or a manipulator-guided sensor. If the first and second aspects are combined with each other, the measuring device reference system is advantageously defined both in reference to the attaching device measurement points and to the calibration points situated on the attaching device.

Now if the position of the reference system fixed in relation to the manipulator is also known relative to the surroundings, for example by measuring the calibration points relative to an environmental reference system or by arranging the measuring device and manipulator base in known positions in the environment, for example a production cell, it is possible to determine therefrom the absolute positions of the measuring body measurement points in the reference system fixed in relation to the manipulator, in particular a reference system fixed in relation to the manipulator base, where the manipulator base can also represent an environment in this respect.

The manipulator can be measured or calibrated absolutely thereby. In particular, through such a calibration it is possible to adjust model parameters of a manipulator model so that the latter describes the actual kinematics or dynamics of the manipulator as precisely as possible.

Since model parameters, for example rigidities or elastic deformations of manipulator arms, can differ for different poses, in a preferred embodiment at least four non-coplanar measuring bodies are used. These always span a volume in the working space of the manipulator. By calibrating the manipulator by means of these four measuring bodies, preferably while compensating for, in particular averaging the model parameters determined with the individual measuring bodies, it is possible in this way to create or adapt a manipulator model which describes the kinematics of the manipulator very precisely, in particular a position of a reference point that is fixed relative to the manipulator, such as the TCP.

Additionally or alternatively, in particular when measuring relatively for recalibration, knowledge of the locations of the absolute positions of the measuring body measurement points in the reference system fixed in relation to the environment or to the manipulator makes it possible to move to the measuring body or to the measuring body measurement points more efficiently, since the latter are no longer detected iteratively by a manipulator-guided sensor, but rather are available as target coordinates in a trajectory plan executed offline, in particular in advance.

If one or more measurement poses are moved to in such a way on the basis of such a measuring device reference system which is defined in reference to calibration points and/or attaching device measurement points, it is preferred to define bypass points in the measuring device reference system for moving to a measurement pose without collisions. For example, if the positions of markers on a spherical surface of a measuring body are known in the measuring device reference system, and thereby also in a reference system that is fixed in relation to the manipulator, these positions can each be shifted radially away from the sphere by a predefined distance. The bypass points thus defined then form a network surrounding the sphere at a distance, such that when it is traversed with a manipulator-guided tool or reference point such as the TCP, a collision between measuring device and manipulator is avoided.

In a preferred embodiment, one or more calibration points situated on the attaching device and/or attaching device measurement points are at least partially sunk into the attaching device and/or protected by a covering. This protects the measurement points, or the markers, retroreflectors or the like that define them, against damaging environmental influences.

Preferably, a measuring device according to the invention has three, four or more measuring body measurement points, attaching device measurement points and/or calibration points. Three non-collinear attaching device measurement points or calibration points permit clear definition of a measuring device reference system. Four non-collinear but preferably coplanar points increase the probability of being able to register at least three points in various, in particular random orientations, and thus to define the reference system. If more than three attaching device measurement points or calibration points are registerable, this redundancy can be used to increase the precision, for example by using the measured values to solve a corresponding compensation problem.

A third aspect of the present invention, which can be combined with the first and/or second aspect explained above, relates to the production of a measuring body having measurement points fixed in relation to the measuring body. To this end a template is proposed, preferably of two or more parts, which can be arranged on the measuring body in a defined orientation.

Such a defined orientation can be achieved for example in that the template at least partially surrounds a measuring body that is not rotationally symmetrical, on three surfaces having no coplanar pairs, for example a base surface of a cube and two lateral surfaces adjoining the latter at edges. With rotationally symmetrical measuring bodies, for example a sphere having a cylindrical shaft formed on in one piece, one of the elements, the measuring body or the template, may have one or more indentations and/or projections which engage corresponding projections or indentations of the other element, the measuring body or the template, when the template is arranged in the defined orientation on the measuring body.

After the template has been arranged thus on the measuring body, measuring body measurement points are arranged on the latter in positions predefined by the template. For example, to this end the template may have through boreholes through which a marker, a drill or a marking tool is passed. After the template is removed, markers can be situated at the positions identified by the drill or the marking tool, for example a pen; for example, they may be glued on.

In this way the measuring body measurement points can be arranged precisely at predefined positions on the measuring body, which can for example make it easier for them to be detected by a manipulator-guided sensor.

BRIEF DESCRIPTION OF THE DRAWINGS

Additional advantages and features result from the subordinate claims and the exemplary embodiments. To this end the drawing shows the following, partially in schematic form:

DETAILED DESCRIPTION

Figure 1:
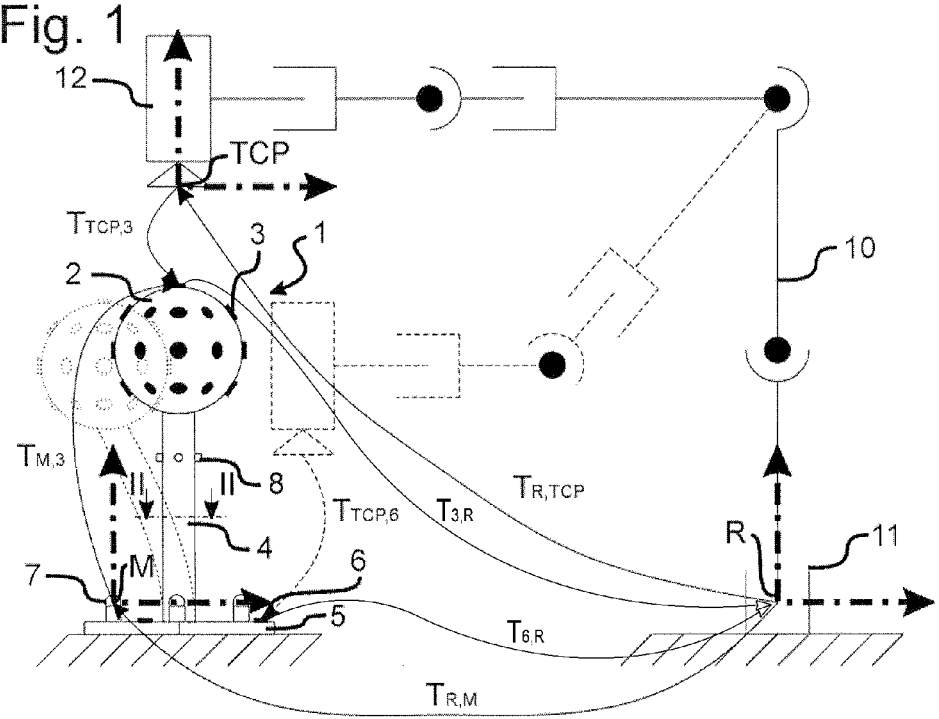
FIG. 1: measurement of a manipulator using a measuring system according to an embodiment of the present invention.
Figure 2:
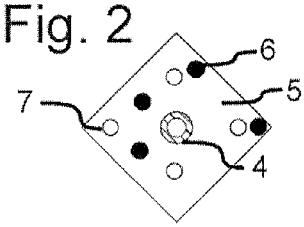
FIG. 2: a top view of the base plate of the measuring apparatus of the measuring system according to FIG. 1 along cutting line II-II there.

FIG. 1 shows a measuring system according to one embodiment of the present invention during measurement of a six-axis measuring robot 10.

The measuring system includes a measuring apparatus 1 with a measuring body in the form of a sphere 2, onto which are glued, in predefined positions, markers 3 that can be registered by a CCD camera 12 on the tool flange of measuring robot 10.

The production of measuring body 2 will first be explained, with reference to FIGS. 1, 4. This is made of carbon-fiber reinforced plastic (CFRP) in a single piece with an integrated shaft 4, so that measuring body 2 and shaft 4 have a low longitudinal coefficient of expansion a of approximately $0.2 \cdot 10^{-6}$/K. The shaft can be connected to an attaching device in the form of a base plate 5 either detachably, for example using screws, or non-detachably, for example by gluing, in order to fix the entire measuring apparatus by bolting the base plate 5 by its bottom to an environment in the form of an assembly cell or robot cell.

Figure 4:
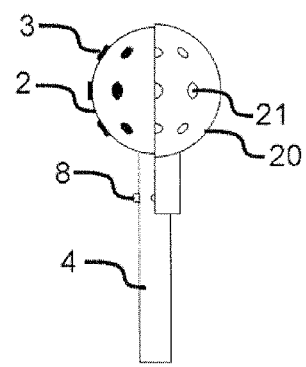
FIG. 4: production of the measuring apparatus according to FIG. 1.

In order to glue markers 3 onto sphere 2 in predefined positions, a two-piece dome-shaped template 20 is situated on the latter, of which one half of a template is depicted in FIG. 4. One or more hemispherical elevations 8 are formed on shaft 4, and corresponding complementary hemispherical indentations (not shown) on the insides of the templates. Because of the mutually engaging elevations 8 and indentations, template 20 can only be situated reproducibly in one or more defined orientations on rotationally symmetrical measuring body 3.

Template 20 has a plurality of through boreholes 21 in predefined positions. When the template is applied, a marking pen for example can be inserted through these in order to identify a position for gluing on a marker 3 after template 20 is removed, or a marker can be glued on directly. In this way, the markers 3 can be positioned on sphere 2 in positions predefined by the template.

It can be seen in FIG. 4 that despite the rotational symmetry of sphere 2 and multi-piece template 20, even one non-symmetrical elevation-indentation pair is sufficient for defined positioning of the template on the sphere, for example an elevation or an indentation in only one rim of the two hemispherical templates. If a plurality of elevations and indentations are distributed on shaft 4, however, even with only the template part 20 shown in FIG. 4 all markers 3 can be positioned in succession on sphere 2 by repositioning it on other elevations 8, as depicted in FIG. 4.

Base plate 5 is populated with four additional markers 6 that can be registered by CCD camera 12 as they are arranged on sphere 2, and four retroreflectors 7 that can be registered by a laser tracker (not shown). Both the markers 6 and the retroreflectors 7 in the form of so-called laser tracker nests, i.e., retroreflectors mounted so that their angles can be repositioned, are partially sunk into base plate 5 and protected by a transparent covering (not shown). A measuring apparatus reference system M is defined by them or by the indentations that receive them (see FIG. 1).

Next, measuring apparatus 1 is exactly measured in advance, for example using a coordinate measuring machine or an image evaluation system. In this case the measuring body measurement points defined by the markers 3 are determined relative to the measuring apparatus reference system M, which is defined in reference to the calibration points defined by the retroreflectors or laser tracker nests 7 and/or in reference to the markers or attaching device measurement points situated on base plate 5. In this way a position $T_{M,3}$ is known between measuring apparatus reference system M and the positions of markers 3 on sphere 2, as indicated by an arrow in FIG. 1.

Now measuring apparatus 1 is fixed in the robot cell by bolting down its base plate 5. A laser tracker (not shown) determines the positions of the calibration points defined by the retroreflectors 7 relative to a reference system R that is fixed in relation to the surroundings and in relation to the manipulator in the base 11 of the robot. In that way the position $T_{R,M}$ between the manipulator-fixed reference system and the measuring apparatus reference system is also known (see FIG. 1). This can also be accomplished by calibrating both the measuring apparatus reference system M and the manipulator-fixed reference system R using the laser tracker.

Referring to FIG. 1, a relative measurement of measuring robot 10 to compensate for temperature drift and to check measuring apparatus 1 will now first be explained.

At the beginning of operation, for example, robot 10 moves with its camera 12 to various measurement poses, at which markers 3 on the sphere or markers 6 on base plate 5 are recorded with the camera and their positions are determined by an image recognition system, for example in a camera reference system. This ascertained position is indicated in FIG. 1 by position $T_{TCP,3}$ or $T_{TCP,6}$. Sketched into FIG. 1 with solid lines on the one hand is a measurement pose of robot 10 to determine the position of a reference point TCP fixed in relation to the manipulator and of a measuring body measurement point defined by a marker 3 relative to each other, and on the other hand with dashed lines another measurement pose of the robot to determine a position of an attaching device measurement point defined by a marker 6 relative to the reference point TCP fixed in relation to the manipulator. In a preferred embodiment the manipulator moves to approximately 20 different measurement poses. On the basis of a robot model that is indicated in FIG. 1 by arrow $T_{R,TCP}$, these positions can also be transformed into positions $T_{3,R}$ and $T_{6,R}$ relative to the reference system R which is fixed in relation to the base.

Then, during operation, the manipulator is again moved to one or more of these measurement poses and positions $T_{TCP,3}$ of manipulator-fixed reference point TCP relative to measuring body markers 3 and positions $T_{TCP,6}$ of manipulator-fixed reference point TCP relative to attaching device marker 6 are again determined, by camera 12 recording the markers 3 or 6 and by an image recognition and evaluation system determining their positions in the reference system fixed in relation to the camera.

From the positions of the markers 3 and 6 relative to each other in the reference system fixed in relation to the camera, it is also possible to determine the positions $T_{M,3}$ of the measuring body markers 3 relative to the measuring device reference system M which is defined in reference to the attaching device markers 6.

If measuring body 2 has moved and/or twisted relative to base plate 5 with deformation of shaft 4, as indicated by dotted lines in FIG. 1, for example due to a collision with the robot-guided camera 12, these relative positions $T_{M,3}$ of the measuring body markers 3 relative to the measuring apparatus reference system M deviate from those that were ascertained in a preceding or initial measurement on site or during production of the measuring apparatus. Accordingly, it is possible to detect a deformation of measuring apparatus 1 and, in a preferred embodiment, to compensate for it by making allowance in computations for the deformation ascertained from the deviation of the relative positions. In other words, relative positions between the measuring body markers 3 and the attaching device markers 6 are determined, and a deformation of measuring apparatus 1 is ascertained from a change in these relative positions:

$$(T_{TCP,3}, T_{TCP,6})_{present} \Rightarrow (T_{M,3})_{present}$$

$$(T_{M,3})_{present} - (T_{M,3})_{reference} \Rightarrow \text{deformation} \quad (1)$$

In the present case, for a more compact depiction, in particular also a position or the change of a position of a point, for example a measuring body marker 3, relative to other points, for example attaching device markers 6, is designated as a position relative to a reference system defined by the other points, for example the detaching device reference system M, or as the change of a position relative to this reference system, where in the practical implementation of the invention the reference system as such does not necessarily have to be defined, but rather the positions of the points relative to each other can also be used directly, for example as a difference of position vectors.

On the other hand, if the relative positions between measuring body markers 3 and attaching device markers 6 are unchanged within the framework of a predefinable tolerance, but the positions $T_{TCP,3}$ of the measuring body markers 3 deviate from those that were determined in a preceding or initial measurement on site, this is due to a change in the manipulator kinematics, for example due to thermal or mechanical deformations of robot arms caused thermally or mechanically for example by a collision, since camera 12 is in a different position relative to the markers 3 despite the theoretically identical measurement pose. Accordingly, the parameters of a kinematic robot model can be adjusted so that the differences from the previously determined positions $T_{TCP,3}$ of the measuring body markers 3 relative to the reference point TCP fixed in relation to the manipulator are minimal. In other words, the robot model on which the control system is based can be adapted so that camera 12 again occupies the same position relative to the markers 3 in the theoretically identical measurement pose determined by the joint angle. In the same way, it is possible to determine the change in the manipulator kinematics from the change of the positions of the markers 3 relative to camera 12 and to make allowance for it in the robot model. In particular, the positions of the markers 3 that have now been measured can be transformed into the base-fixed reference system, and the parameters of the robot model can be adapted so that the positions ascertained in a previous or initial measurement on site again result:

change $T_{R,TCP}$ so that $(T_{TCP,3})_{present} - (T_{TCP,3})_{reference} \rightarrow 0$ or $$(T_{TCP,3})_{present}, T_{R,TCP} \Rightarrow (T_{R,3})_{present};$$

change $T_{R,TCP}$ so that $(T_{R,3})_{present} - (T_{R,3})_{reference} \rightarrow 0$ Preferably, positions of attaching device markers 6 are also taken into account in such a recalibration. In contrast to these markers 6 situated on the base plate 5, however, the markers 3 glued to sphere 2 allow positions to be registered in very different measurement poses of robot 10, so as to adapt as many model parameters as possible as exactly as possible.

Due to the measurement of the markers 3 relative to the measuring device reference system M, which is defined relative to the retroreflectors 7, and the measurement of these calibration points relative to the reference system which is fixed in relation to the manipulator, the absolute positions of the markers 3 in the reference system R which is fixed in relation to the manipulator are also known.

This makes it easier on the one hand to recalibrate to compensate for a temperature drift or the like, as explained above. This is because on the basis of the positions of the markers 3 which are known in the reference system fixed in relation to the manipulator, it is possible to move to those positions optimally. In particular, a trajectory plan in a reference system R fixed in relation to the manipulator can determine bypass points on the basis of these positions for moving to measurement poses without collisions. For example, auxiliary points for collision-free travel around measuring body 2 can be determined on a sphere by bypass points that are spaced away from sphere 2 in the direction of the markers 3.

On the other hand, however, it also enables absolute measurement, in order to calibrate a highly exact robot model precisely in a defined working space.

Figure 3:
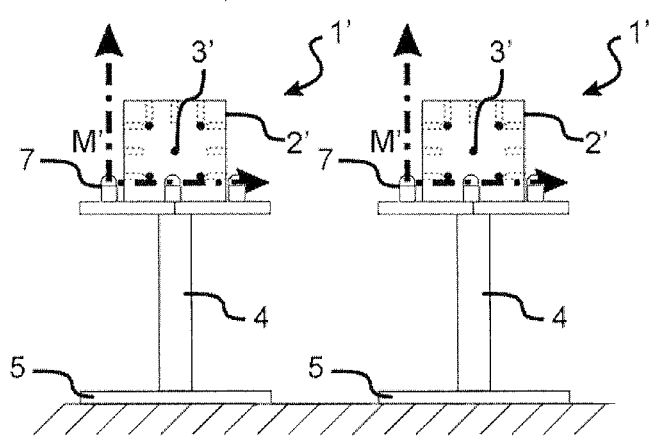
FIG. 3: an alternative measuring apparatus.

To this end, in the same way in principal as described above in reference to FIGS. 1 and 4, four measuring apparatuses 1' (or else 1) are arranged in the working space in such a way that they span a volume within which the robot model is calibrated highly precisely. We will now look more closely at only the differences from the embodiment explained earlier, with reference to FIG. 3.

It can be seen that the measuring body 2' of such a measuring apparatus 1' is cube-shaped. Situated on each of the five side surfaces that are not connected to shaft 4 are five measuring body measurement points in the form of blind bores 3', which are registered by camera 12 and whose positions can be determined using image recognition and evaluation. The calibration points in the form of the retroreflectors 7, which can be registered by the laser tracker, are situated in this embodiment in immediate proximity to measuring body 2', in order to minimize measuring errors when determining the absolute positions of the geometric features 3'.

As explained above, the positions $T_{M,3'}$ of the blind bores 3' relative to the measuring device reference system M, which is defined in relation to the calibration points 7, is measured exactly in advance, for example by a coordinate measuring machine. From the positions of the calibration points 7 measured by means of a laser tracker relative to the reference system R, which is fixed in relation to the base, it is thus possible to determine the absolute positions $T_{R,3'}$ of the blind bores 3' of the measuring apparatuses 1' situated in the robot cell in the reference system R, which is fixed in reference to the base.

The positions of these measuring body markers 3' of the four measuring apparatuses 3' are now determined using camera 12, and are likewise transformed on the basis of the highly exact robot model into the reference system R, which is fixed in relation to the base. On the basis of the deviations of the bores 3' which result from the position of the measuring device reference system M relative to the reference system R which is fixed in relation to the manipulator, determined by means of a laser tracker, and the positions of the bores 3' which result from the positions of the bores 3' determined by means of camera 12 relative to the camera reference system and the position determined by means of the robot model in the reference system R which is fixed in relation to the base, parameters of the highly exact robot model can be precisely adapted for positions of the TCP within the space that is spanned by the four measuring bodies 2' which do not lie in one plane:

$$(T_{M',3'}),(T_{R,M'}) \Rightarrow (T_{R,3'})_{actual}$$

$$(T_{TCP,3'}),(T_{R,TCP}) \Rightarrow (T_{R,3'})_{model}$$

change $T_{R,TCP}$ so that $(T_{R,3'})_{actual}-(T_{R,3'})_{model} \rightarrow 0$ Preferred embodiments were described above, in which a plurality of aspects of the present invention were combined with each other. The individual aspects can also each be realized alone, however. For example, a recalibration to compensate for temperature drift can also be performed without calibrating the measuring device reference system M using a laser tracker, but knowledge of the position of the measuring apparatus reference system M relative to the system R, which is fixed in relation to the base, makes it easier to move to the measurement poses. In the same way, an absolute measurement to determine the parameters of a highly exact robot model can also be performed using the measuring apparatus 1 according to FIG. 1.

REFERENCE LABELS

1; 1' measuring apparatus
2; 2' measuring body
3; 3' measuring body measurement point
4 shaft
5 base plate (fastening device)
6 fastening device measurement point
7 calibration point
8 elevation
10 robot
11 robot base
12 camera (sensor)
20 template (half)
21 hole for marking the measuring body measurement point
$T_{X,Y}$ position between the X and Y systems
R reference system fixed in relation to the manipulator
M; M' measuring apparatus reference system
TCP tool center point

What is claimed is:

1. An apparatus for determining at least one of a position or an orientation of a reference point on a robotic manipulator, the apparatus comprising:
a first measurement body;
attachment structure operatively coupled to said first measurement body for fixing said first measurement body against movement with respect to a first reference frame during calibration;
at least one first measurement feature on said first measurement body, the first measurement feature used for determining at least one of a position or an orientation of the reference point on the robotic manipulator relative to a second reference frame associated with said first measurement body;
at least one first calibration feature on the apparatus, the first calibration feature used for determining at least one of a position or an orientation of the second reference frame relative to the first reference frame;
at least one second measurement feature on said attachment structure;
at least one second measurement body;
second attachment structure operatively coupled to said second measurement body for fixing said second measurement body with respect to the first reference frame;
at least one third measurement feature on said second measurement body, the third measurement feature used for determining at least one of a position or an orientation of the reference point on the robotic manipulator relative to a third reference frame associated with said second measurement body;
at least one second calibration feature on the apparatus, the second calibration feature used for determining at least one of a position or an orientation of the third reference frame relative to the first reference frame; and
at least one fourth measurement feature on said second attachment structure.

2. The apparatus of claim 1, wherein at least one of said first calibration feature, said first measurement feature, or said second measurement feature is configured to be detected by a sensor.

3. The apparatus of claim 1, wherein at least one of said first calibration feature, said first measurement feature, or said second measurement feature is configured to transmit a signal that facilitates determining the position or orientation.

4. The apparatus of claim 1, wherein said at least one first calibration feature is located on said attachment structure.

5. The apparatus of claim 1, wherein said at least one first measurement feature comprises at least three first measurement features.

6. The apparatus of claim 1, wherein said measurement body is one of spherically-shaped or cube-shaped.

7. The apparatus of claim 1, further comprising a connecting member integrally formed with said measurement body as a single-piece unitary construction, said connecting member connecting said measurement body to said attachment structure.

8. The apparatus of claim 7, wherein said measurement body and said connecting member comprise material having a low coefficient of thermal expansion.

9. The apparatus of claim 8, wherein the coefficient of thermal expansion is less than or equal to approximately $0.1 \times 10^{-4}/K$.

10. The apparatus of claim 8, wherein said measurement body and said connecting member comprise carbon-fiber reinforced polymer.

11. The apparatus of claim 1, wherein said at least one second measurement body comprises at least three second measurement bodies, each of said first and second measurement bodies being positioned in different planes.

12. The apparatus of claim 1, further comprising:
a sensor operatively coupled to the robotic manipulator and positioned to facilitate determining the at least one position or orientation of the reference point on the robotic manipulator with respect to said first measurement feature, said second measurement feature, or said first calibration feature.

13. A method of determining at least one of a position or an orientation of a reference point on a robotic manipulator, the method comprising:
moving the robotic manipulator to at least one pose; and
determining the at least one position or orientation of the reference point relative to a measurement device, the measurement device comprising:
a measurement body,
attachment structure operatively coupled to the measurement body for fixing the measurement body against movement with respect to a first reference frame during calibration,
at least one first measurement feature on the measurement body, the first measurement feature used for determining at the least one position or orientation of the reference point on the robotic manipulator relative to a second reference frame associated with the measurement body,
at least one first calibration feature on the measurement device, the first calibration feature used for determining at least one of a position or an orientation of the second reference frame relative to the first reference frame,
at least one second measurement feature on the attachment structure,
at least one second measurement body,
second attachment structure operatively coupled to said second measurement body for fixing said second measurement body with respect to the first reference frame,
at least one third measurement feature on said second measurement body, the third measurement feature used for determining at least one of a position or an orientation of the reference point on the robotic manipulator relative to a third reference frame associated with said second measurement body,
at least one second calibration feature on the apparatus, the second calibration feature used for determining at least one of a position or an orientation of the third reference frame relative to the first reference frame, and
at least one fourth measurement feature on said second attachment structure.

14. The method of claim 13, further comprising:
determining at least one of a position or an orientation of the at least one first measurement feature relative to the second reference frame, wherein the second reference frame is defined with respect to the at least one second measurement feature or the at least one first calibration feature.

15. The method of claim 14, further comprising:
determining at least one of a position or an orientation of at least one of the at least one second measurement feature or the at least one first calibration feature with respect to the first reference frame.

16. The method of claim 13, further comprising:
determining bypass points for moving the robotic manipulator to the at least one pose without collision of the robotic manipulator with the measurement device.

* * * * *